(12) United States Patent
Lau et al.

(10) Patent No.: US 8,824,245 B2
(45) Date of Patent: Sep. 2, 2014

(54) TOUCH SCREEN WATCH

(75) Inventors: Wai Cheong Lau, South Horizons (HK); Chun Wai Tse, Lam Tin (HK)

(73) Assignee: Advance Watch Company, Ltd., Long Island, NY (US)

( * ) Notice: Subject to any disclaimer, the term of this patent is extended or adjusted under 35 U.S.C. 154(b) by 616 days.

(21) Appl. No.: 12/911,205

(22) Filed: Oct. 25, 2010

(65) Prior Publication Data

US 2012/0099406 A1 Apr. 26, 2012

(51) Int. Cl.
*G04C 17/00* (2006.01)
(52) U.S. Cl.
USPC ............................................. 368/69; 368/296
(58) Field of Classification Search
USPC .......................................................... 368/69
See application file for complete search history.

(56) References Cited

U.S. PATENT DOCUMENTS

| | | | |
|---|---|---|---|
| 4,048,796 A | 9/1977 | Sasaki | |
| 4,059,956 A | 11/1977 | Maeda et al. | |
| 4,064,688 A | 12/1977 | Sasaki et al. | |
| 4,090,353 A | 5/1978 | Maeda et al. | |
| 4,120,148 A | 10/1978 | Moyer | |
| 4,228,534 A | 10/1980 | Fellrath et al. | |
| 4,255,802 A | 3/1981 | Ogawa | |
| 4,257,117 A | 3/1981 | Besson | |
| 4,322,833 A | 3/1982 | Husted | |
| 5,088,070 A | 2/1992 | Shiff | |
| 5,453,960 A | 9/1995 | Teres et al. | |
| 5,790,698 A * | 8/1998 | Nguyen ........................ | 382/187 |
| 5,812,498 A * | 9/1998 | Teres .............................. | 368/10 |
| 6,052,339 A | 4/2000 | Frenkel et al. | |
| 6,184,871 B1 | 2/2001 | Teres et al. | |
| 6,246,394 B1 | 6/2001 | Kalthoff et al. | |
| 6,463,011 B1 * | 10/2002 | Christen et al. ................. | 368/69 |
| 6,570,443 B2 | 5/2003 | Casagrande | |
| 6,603,708 B2 | 8/2003 | Tamagawa et al. | |
| 6,816,440 B2 | 11/2004 | Born et al. | |
| 6,868,046 B2 | 3/2005 | Farine et al. | |
| 6,882,596 B2 | 4/2005 | Guanter et al. | |
| 6,967,903 B2 | 11/2005 | Guanter | |
| 7,031,226 B2 | 4/2006 | Farine | |
| 7,031,228 B2 | 4/2006 | Born et al. | |

(Continued)

FOREIGN PATENT DOCUMENTS

| | | |
|---|---|---|
| CN | 201518095 U | 6/2010 |
| EP | 1235122 A1 | 8/2002 |
| WO | 2011000893 A1 | 1/2011 |
| WO | 2011121000 A1 | 10/2011 |

OTHER PUBLICATIONS www.tissot.ch, "T-Touch, multifunctions—User's manual", Tissot, Jan. 2007 14 pages.

(Continued)

*Primary Examiner* — Amy Cohen Johnson
*Assistant Examiner* — Jason Collins
(74) *Attorney, Agent, or Firm* — Brooks Kushman P.C.

(57) ABSTRACT

A wristwatch includes a case and a corresponding crystal, and an integrated circuit sized to be received with the case. The wristwatch has a first, second, third, and fourth capacitive touch sensor adapted to be located beneath the crystal and within the case when the wristwatch is assembled. The capacitive touch sensors are in electrical communication with the integrated circuit to control operation of the wristwatch. The capacitive touch sensors are located adjacent to the periphery of the crystal and are spaced apart.

15 Claims, 14 Drawing Sheets

(56) References Cited

U.S. PATENT DOCUMENTS

| | | |
|---|---|---|
| 7,042,809 B2 * | 5/2006 | Mignot .................... 368/223 |
| 7,167,689 B2 * | 1/2007 | Martin et al. ............. 455/90.3 |
| 7,286,063 B2 | 10/2007 | Gauthey et al. |
| 7,420,881 B2 | 9/2008 | Frenkel et al. |
| 7,428,191 B1 | 9/2008 | Klein |
| 7,507,929 B2 | 3/2009 | Streifler |
| 7,712,954 B2 * | 5/2010 | Bourban et al. ........... 368/296 |
| 7,778,118 B2 * | 8/2010 | Lyons et al. .............. 368/69 |
| 7,932,893 B1 * | 4/2011 | Berthaud .................. 345/157 |
| 2002/0118605 A1 * | 8/2002 | Born et al. ................ 368/69 |
| 2004/0113819 A1 | 6/2004 | Gauthey et al. |
| 2006/0170649 A1 | 8/2006 | Kosugi et al. |
| 2009/0059730 A1 | 3/2009 | Lyons et al. |
| 2009/0196124 A1 | 8/2009 | Mooring |
| 2009/0199130 A1 | 8/2009 | Tsern et al. |
| 2009/0280861 A1 | 11/2009 | Khan |
| 2009/0322725 A1 | 12/2009 | David et al. |
| 2010/0112964 A1 | 5/2010 | Yi et al. |

OTHER PUBLICATIONS gearjunkie.com/timex-ironman-sleek-150-lap-tapscreen, "Timex Watch with TapScreen", Oct. 7, 2009, 3 pages.

engadget.com/2010/08/05/mutewatch-aims-to-be-a-less-watch-like-watch, "Mutewatch aims to be a less watch-like watch", Aug. 5, 2010, 3 pages.

International Search Report for corresponding Application No. PCT/US2011/057691, Feb. 14, 2012, 2 pages.

Written Opinion for corresponding Application No. PCT/US2011/057691, Feb. 14, 2012, 4 pages.

\* cited by examiner

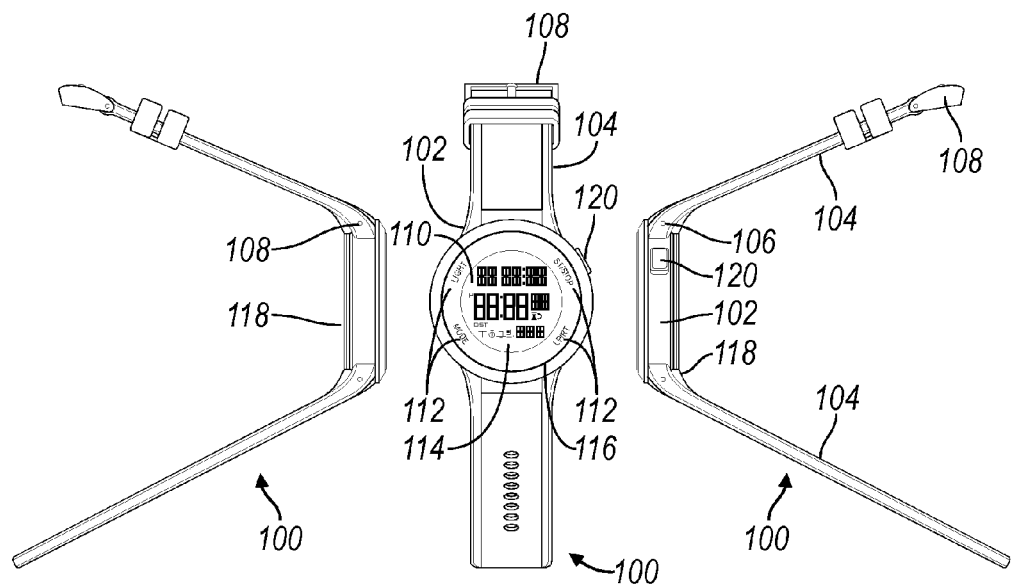
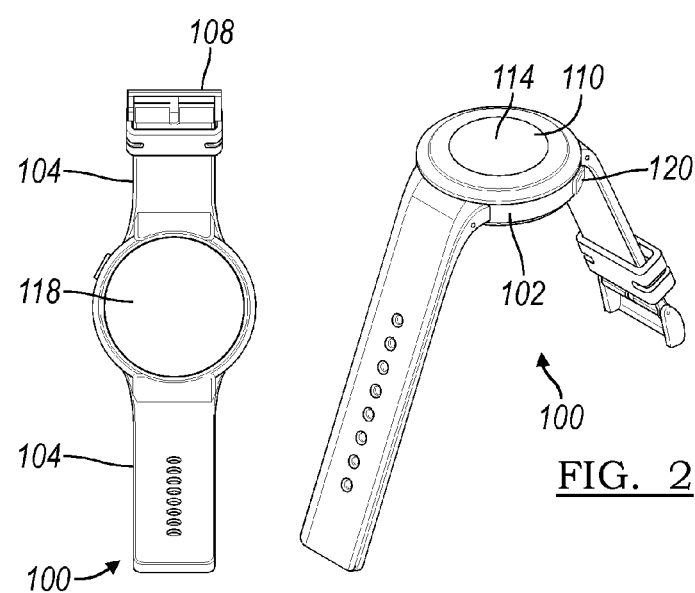

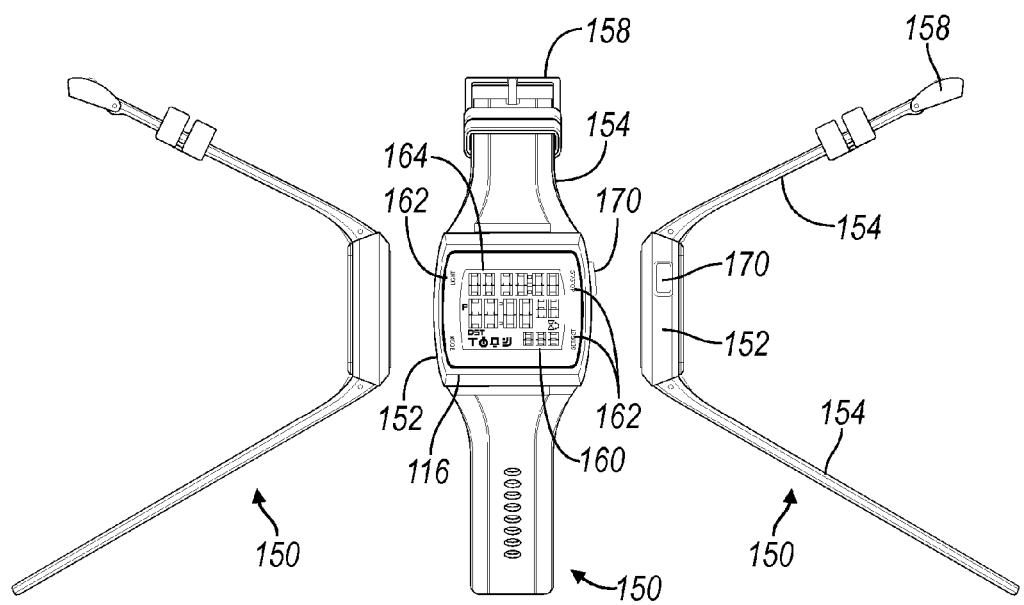
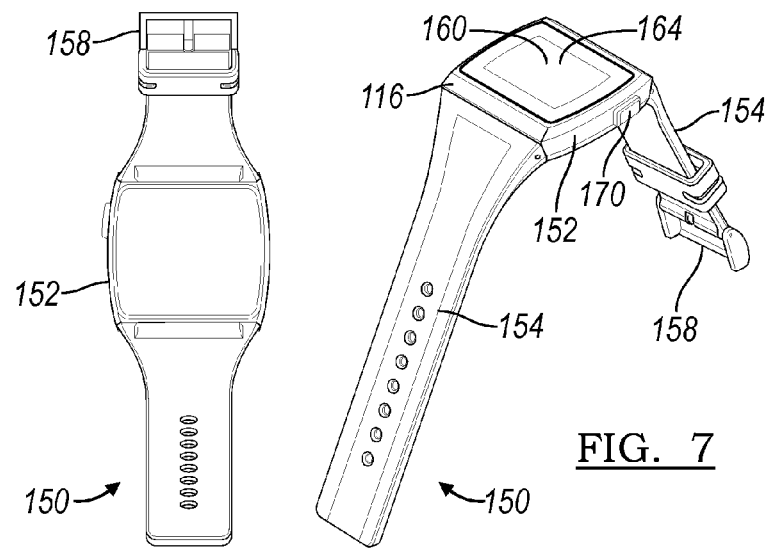

THE MODE SEQUENCE SHALL FOLLOW THE ORDER BELOW.

NOTES:
IF 4 S PASSES OR ANY SWITCH ACTUATION TAKES PLACE IN THIS STATE, THE WATCH SHALL GO TO TIME MODE UPON THE NEXT PRESS OF THE MODE BUTTON FROM THE MODE'S MAIN STATE. OTHERWISE, THE WATCH SHALL GO TO THE MODE BANNER STATE OF THE NEXT MODE.

4 KEYS OPERATION *(unlock)*
IF IT IS UNLOCKING STATUS; ALL KEY FUNCTION IS ENABLED;
BUT IF IT IS LOCKING STATUS, ALL KEY FUNCTION IS DISABLED EXCEPT [LIGHT/TOUCH] KEY FUNCTION IS ENABLE;

| MODE | DESCRIPTION | A MODE | B ST/SP | C SET/RST | D LIGHT/TOUCH |
|---|---|---|---|---|---|
| TIME | PRESS-RELEASE | TO WORLD TIME | - | - | EL ON |
|  | PRESS & HOLD | - | - | SETTING | EL ON |
| TIME SETTING | PRESS-RELEASE | SELECT | NOTES | | EL ON |
|  | PRESS & HOLD | EXIT SETTING | | | EL ON |
| WORLD TIME | PRESS-RELEASE | TO ALARM | NOTES | | EL ON |
|  | PRESS & HOLD | | | | EL ON |
| ALARM | PRESS-RELEASE | TO CHRONO | AL ON/OFF | - | EL ON |
|  | PRESS & HOLD | - | - | SETTING | EL ON |
| ALARM SETTING | PRESS-RELEASE | SELECT | NOTES | | EL ON |
|  | PRESS & HOLD | EXIT SETTING | | | EL ON |
| CHRONO (RESET) | PRESS-RELEASE | TO TIMER | START | - | EL ON |
|  | PRESS & HOLD | - | - | - | EL ON |
| CHRONO (RUNNING) | PRESS-RELEASE | TO TIMER | STOP | - | EL ON |
|  | PRESS & HOLD | - | - | - | EL ON |
| CHRONO (STOPPED) | PRESS-RELEASE | TO TIMER | START | RESET | EL ON |
|  | PRESS & HOLD | - | - | - | EL ON |
| TIMER (RESET) | PRESS-RELEASE | TO TIME | START | - | EL ON |
|  | PRESS & HOLD | - | - | SETTING | EL ON |
| TIME SETTING | PRESS-RELEASE | SELECT | NOTES | | EL ON |
|  | PRESS & HOLD | EXIT SETTING | | | EL ON |
| TIMER (RUNNING) | PRESS-RELEASE | TO TIME | STOP | - | EL ON |
|  | PRESS & HOLD | - | - | - | EL ON |
| TIMER (STOPPED) | PRESS-RELEASE | TO TIME | START | RESET | EL ON |
|  | PRESS & HOLD | - | - | - | EL ON |

NOTES:
[OPERATION 1] = SLIDE ON THE TOUCH SURFACE FROM [ST/STOP] TO [SET/RST] IN CLOCKWISE DIRECTION FOR INCREASE THE SETTING VALUE, IF [SET/RST] IS HOLD TO FAST ADVANCE.

[OPERATION 2] = SLIDE ON THE TOUCH SURFACE FROM [SET/RST] TO [ST/STOP] IN ANTICLOCKWISE DIRECTION FOR DECREASE THE SETTING VALUE, IF [ST/STOP] IS HOLD TO FAST ADVANCE.

PRESS AND HOLD [MODE] OVER 3 SEC TO EXIT TIME SETTING;

TURN ON THE EL BACKLIGHT IN LOCK STATUS, TOUCH AND HOLD [LIGHT/TOUCH] 3 SEC.

FIG. 21

5 KEYS OPERATION
IF IT IS UNLOCKING STATUS; ALL KEY FUNCTION IS ENABLED;
BUT IF IT IS LOCKING STATUS, ALL KEY FUNCTION IS DISABLED EXCEPT [TOUCH] FUNCTION IS ENABLED;

| MODE | DESCRIPTION | A<br>MODE | B<br>ST/SP | C<br>SET/RST | D<br>LIGHT/TOUCH | E<br>TOUCH |
|---|---|---|---|---|---|---|
| TIME | PRESS-RELEASE | TO WORLD TIME | | | EL ON | TO UNLOCK |
| TIME | PRESS & HOLD | - | | SETTING | EL ON | |
| TIME SETTING | PRESS-RELEASE | SELECT | NOTES | | EL ON | |
| TIME SETTING | PRESS & HOLD | EXIT SETTING | NOTES | | EL ON | |
| WORLD TIME | PRESS-RELEASE | TO ALARM | NOTES | | EL ON | TO UNLOCK |
| WORLD TIME | PRESS & HOLD | | NOTES | | EL ON | |
| ALARM | PRESS-RELEASE | TO CHRONO | AL ON/OFF | | EL ON | TO UNLOCK |
| ALARM | PRESS & HOLD | - | - | SETTING | EL ON | |
| ALARM SETTING | PRESS-RELEASE | SELECT | NOTES | | EL ON | |
| ALARM SETTING | PRESS & HOLD | EXIT SETTING | NOTES | | EL ON | |
| CHRONO (RESET) | PRESS-RELEASE | TO TIMER | START | | EL ON | |
| CHRONO (RESET) | PRESS & HOLD | - | - | | EL ON | |
| CHRONO (RUNNING) | PRESS-RELEASE | TO TIMER | STOP | | EL ON | |
| CHRONO (RUNNING) | PRESS & HOLD | - | - | - | EL ON | |
| CHRONO (STOPPED) | PRESS-RELEASE | TO TIMER | START | RESET | EL ON | |
| CHRONO (STOPPED) | PRESS & HOLD | - | - | | EL ON | |
| TIMER (RESET) | PRESS-RELEASE | TO TIME | START | | EL ON | TO UNLOCK |
| TIMER (RESET) | PRESS & HOLD | - | - | SETTING | EL ON | |
| TIME SETTING | PRESS-RELEASE | SELECT | NOTES | | EL ON | |
| TIME SETTING | PRESS & HOLD | EXIT SETTING | NOTES | | EL ON | |
| TIMER (RUNNING) | PRESS-RELEASE | TO TIME | STOP | | EL ON | TO UNLOCK |
| TIMER (RUNNING) | PRESS & HOLD | - | - | - | EL ON | |
| TIMER (STOPPED) | PRESS-RELEASE | TO TIME | START | RESET | EL ON | TO UNLOCK |
| TIMER (STOPPED) | PRESS & HOLD | - | - | | EL ON | |

NOTES:
[OPERATION 1] = SLIDE ON THE TOUCH SURFACE FROM [ST/STOP] TO [SET/RST] IN CLOCKWISE DIRECTION FOR INCREASE THE SETTING VALUE, IF [SET/RST] IS HOLD TO FAST ADVANCE.

[OPERATION 2] = SLIDE ON THE TOUCH SURFACE FROM [SET/RST] TO [ST/STOP] IN ANTICLOCKWISE DIRECTION FOR DECREASE THE SETTING VALUE, IF [ST/STOP] IS HOLD TO FAST ADVANCE.

PRESS AND HOLD [MODE] OVER 3 SEC TO EXIT TIME SETTING;

THERE CANNOT TURN ON THE EL. BACKLIGHT IN LOCK STATUS.

FIG. 22

TOUCH SCREEN WATCH

BACKGROUND

1. Technical Field

Various embodiments relate to wristwatches.

2. Background Art

Wristwatches, including digital wristwatches, have various modes of operation to provide different functions to a user. The modes and functions are controlled by the user through inputs which interface with the integrated circuit or microchip of the watch to change the appearance of the watch screen or dial. The inputs allow for a user to go to various functions of the watch and operate these functions. For example, a digital watch may provide functions such as a time and date, a stopwatch, a timer, an alarm, and other functions as are known in the art. These inputs may include tactile buttons on the side or the top of the watch body.

SUMMARY

There are two designs shown for the wristwatch, a generally round and a generally square design.

Within each design, a four input system or a five input system may be used.

In one embodiment, a wristwatch has a case and a corresponding crystal, and an integrated circuit sized to be received with the case. The wristwatch has a first, second, third, and fourth capacitive touch sensor adapted to be located beneath the crystal and within the case when the wristwatch is assembled. The capacitive touch sensors are in electrical communication with the integrated circuit to control operation of the wristwatch. The capacitive touch sensors are located adjacent to the periphery of the crystal and are spaced apart.

In a further embodiment, the four capacitive touch sensors are generally equally spaced apart along the periphery of the watch. The spacing may allow for better contact of the capacitive touch sensor by the user, and reduction of the likelihood of activating adjacent sensors inadvertently.

In an even further embodiment, the watch crystal is generally circular.

In a further embodiment, the watch crystal is generally square or rectangular, and may include convex sides.

In an even further embodiment, the wristwatch includes a tactile button positioned on the side of the case.

In another embodiment, a wristwatch has a case and a corresponding crystal, and an integrated circuit sized to be received with the case. The wristwatch has a first and a second capacitive touch sensor located beneath the crystal and in electrical communication with the integrated circuit to control operation of the wristwatch. The capacitive touch sensors provide four inputs to the integrated circuit to control operation of the watch. The first input is through a user activating the first sensor. The second input is through the user activating the second sensor. The third input is through the user sweeping along the crystal and activating the first sensor prior to the second sensor within a time limit. The fourth input is through the user sweeping along the crystal and activating the second sensor prior to the first sensor within a predetermined time limit.

In an embodiment, a wristwatch has a case and a corresponding crystal, and an integrated circuit sized to be received with the case. The integrated circuit has a switch which provides for use with either a four button watch or a five button watch. The watch may be configured as a four button watch having four capacitive touch sensors located beneath the crystal and adjacent to the periphery of the crystal, with the touch sensors in electrical communication with the integrated circuit. The watch may be configured as a five button watch having four capacitive touch sensors located beneath the crystal and adjacent to the periphery of the crystal, with the touch sensors in electrical communication with the integrated circuit, and with a tactile button located adjacent to the case and in communication with the integrated circuit.

BRIEF DESCRIPTION OF THE DRAWINGS

FIG. 1 is a top view of a wristwatch according to an embodiment;

FIG. 2 is a perspective view of the wristwatch of FIG. 1;

FIG. 3 is a side view of the wristwatch of FIG. 1;

FIG. 4 is another side view of the wristwatch of FIG. 1;

FIG. 5 is a rear view of the wristwatch of FIG. 1;

FIG. 6 is a top view of a wristwatch according to another embodiment;

FIG. 7 is a perspective view of the wristwatch of FIG. 6;

FIG. 8 is a side view of the wristwatch of FIG. 6;

FIG. 9 is another side view of the wristwatch of FIG. 6;

FIG. 10 is a rear view of the wristwatch of FIG. 6;

FIG. 21 is a chart of the input operation of a four input wristwatch;

FIG. 22 is a chart of the input operation of a five input wristwatch;

DETAILED DESCRIPTION

Figure 11:
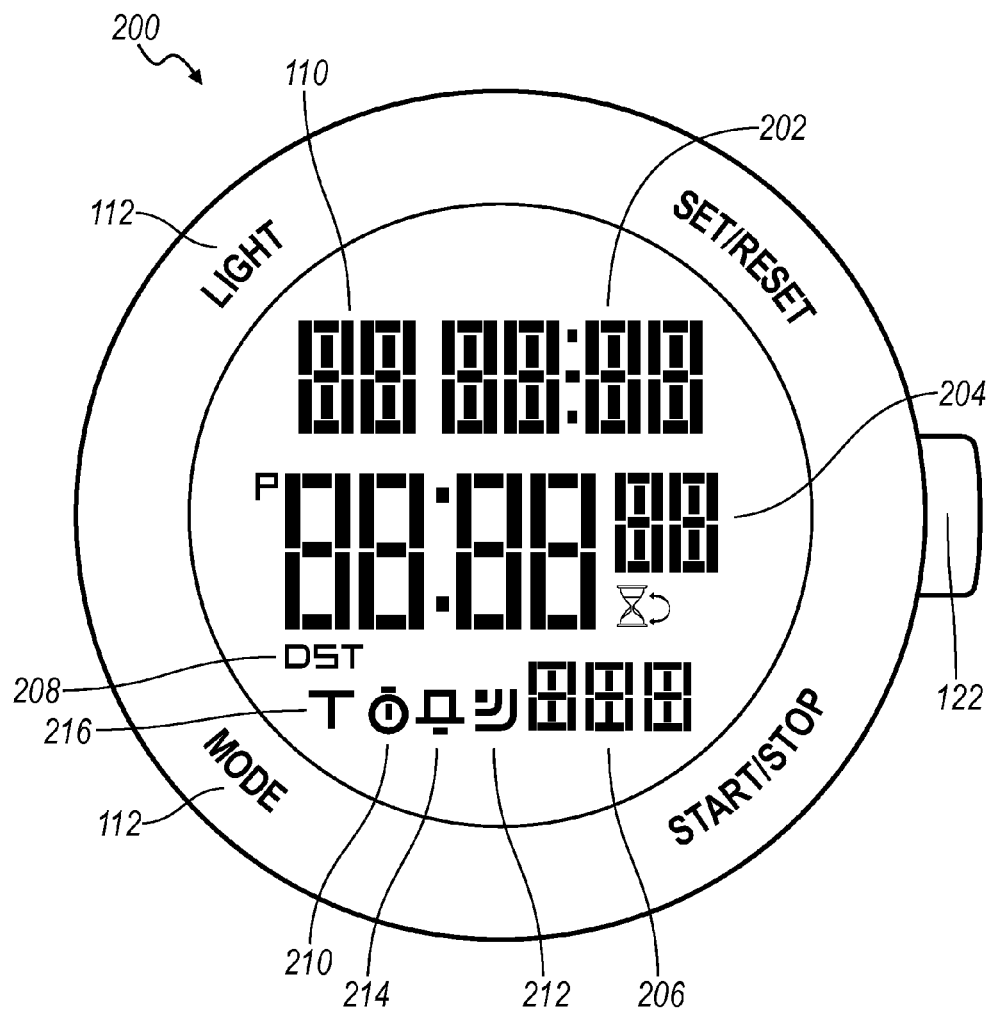
FIG. 11 is a schematic of a display area of a wristwatch according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

FIGS. 1-5 illustrate an embodiment of a wristwatch 100 having a touchscreen. The wristwatch 100 has a case 102 connected to a band 104 by a spring bar 106. Alternatively, the band 104 may be integrally formed with the case 102, or connected using other mechanisms as are known in the art. The band 104 has a clasp 108 connected to one end of the band 104 to allow the watch 100 to be worn around the wrist of a user. Various clasps 108 as are known in the art are contemplated.

The case 102 contains a digital dial 110 which provides information from the watch 100 to a user regarding the time, date, and information from other watch 100 functions. The digital dial 110 also contains touch buttons 112 which act as inputs to the watch 100. A crystal 114 may cover the dial 110 and protect the dial from damage or the environment. A bezel 116 surrounds the dial 110 and cooperates with the crystal 114, the case back 118, and other portions of the case 102 to encase the watch 100. The case 102 and dial 110 are shown as being generally circular, although other shapes are contemplated.

The case 102 may include plastic materials, as well as metal. The crystal 114 may be made from a plastic material or from quartz.

In an embodiment, a series of touch buttons 112 are on the dial 110 of the watch 100 and are positioned between a display area 120 on the watch 110 and the bezel 114. Four touch buttons 112 are illustrated, providing four inputs to the watch 100 from the user. The touch buttons 112 are spaced apart such that a user may easily touch and activate a button 112, and to minimize a use accidentally engaging an incorrect button 112. The touch buttons 112 are integrated into the watch 100 such that the user is touching or tapping the smooth crystal 114 surface to activate a button 112. In other embodiments, any number of touch buttons 112 for the watch 100 is contemplated.

In another embodiment, the watch 100 includes an additional tactile button 122 located on the side of the case 102 to provide an additional input to the watch 100 from the user. The watch 100 therefore has five inputs, the four touch buttons 112 and the tactile button 122.

The user may input information or selections to the watch 100 by touching the crystal 114 in the area over a touch button 112 to activate one button 112 as an input, by touching a first button 112 and sliding the finger of the user to a second button 112 to provide another input, or by pressing the tactile button 122 if the watch 100 is provided with one.

FIGS. 6-10 illustrate another embodiment of a wristwatch 150 having a touch screen. Functionally, the watch 150 operates in the same manner as watch 100 described previously and further below. The wristwatch 150 has a case 152 connected to a band 154. The band 154 has a clasp 158 connected to one end of the band 104. The case 152 contains a digital dial 160 to provide information to a user regarding the time, date, and other information for other watch 150 functions. The digital dial 160 also contains touch buttons 162 which act as inputs to the watch 150. A crystal 164 may cover the dial 160 and protect the dial 160 from damage or the environment. A bezel 166 surrounds the dial 160 and cooperates with the crystal 164, the case back 168, and other portions of the case 152 to encase the watch 150. The case 152 and dial 160 are shown as being generally rectangular, with convex sides.

In one embodiment, the four touch buttons 162 provide inputs from the user to the watch 150. In another embodiment, the four touch buttons 162 and an additional tactile button 172 located on the side of the case 152 provide inputs to the watch 150 from the user.

Referring back to FIGS. 1-2, the watch 100 has a digital dial 110 as shown in FIG. 11. The digital dial 110 provides a digital display for information for the watch 100 user. The dial 110 includes a liquid crystal display (LCD) capable of producing segmented characters and indicia. The dial 110 has multiple display regions, including a first display area 202, second display area 204 and third display area 206. Based on the function selected by the user, the various display areas 202, 204, 206 can relay information regarding time, day of the week, date, a local time zone time and local location or city, a second time for a second time zone and second location or city, a daylight savings time with a daylight savings indicator 208, a timer incrementing in either an increasing or decreasing amounts with a chronometer indicator 210, an alarm mode with an alert chime or light with an alarm indicator 212, a chime function with a chime indicator 214, a back light for illumination of the dial 110, and a touch indicator 216 when the touch buttons 112 are functional or operational on the watch 100.

Figure 14:
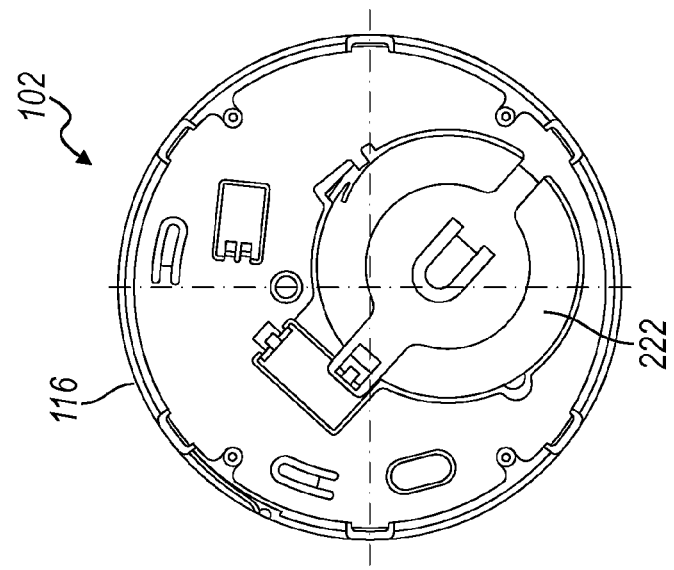
FIG. 14 is a bottom plan view of a bottom portion of a case module for use with the top module of FIG. 12.
Figure 15:
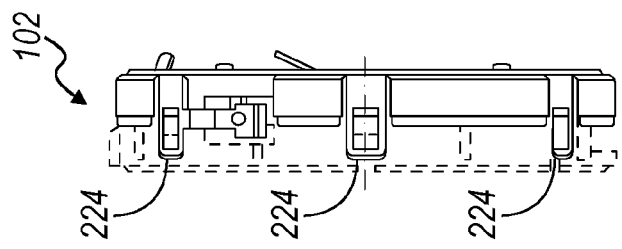
FIG. 15 is a side plan view of the bottom portion of the module of FIG. 14.
Figure 13:
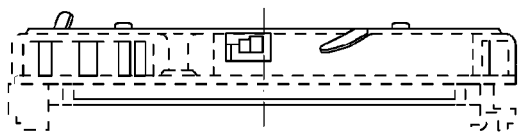
FIG. 13 is a side plan view of the top portion of the module of FIG. 12.
Figure 12:
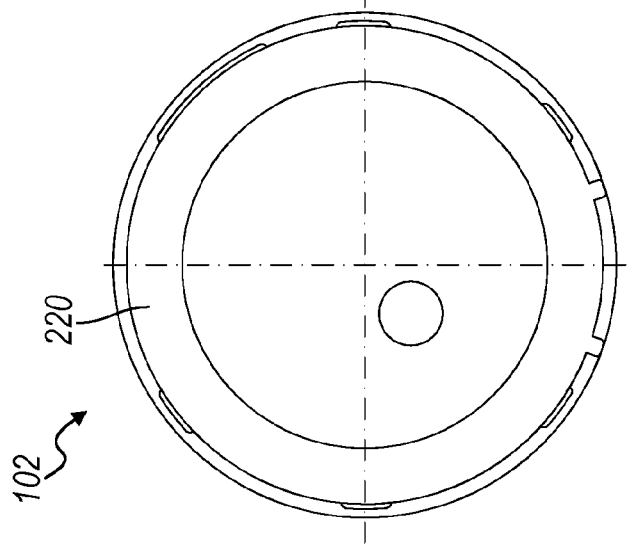
FIG. 12 is a top plan view of a top portion of a case module for a wristwatch according to another embodiment.

The watch case 102 is illustrated in FIGS. 12-14. FIGS. 12 and 13 illustrate a top view and a side view respectively of the front portion 220 of the case 102. FIG. 14 illustrates the back portion 116 of the case 102. The back portion 116 includes a door 222 which can open for the insertion and replacement of a battery. FIG. 15 is a side view of the back portion 116 of the case 102, and includes clips 224 for use in assembling the front portion 220 and back portion 116 of the case 102 together. The clips 224 can be replaced by other fasteners as are known in the art for assembling the case. The dimensions depicted in FIGS. 6-8 illustrate one embodiment of the watch 100, and other dimensions are also contemplated.

Figure 16:
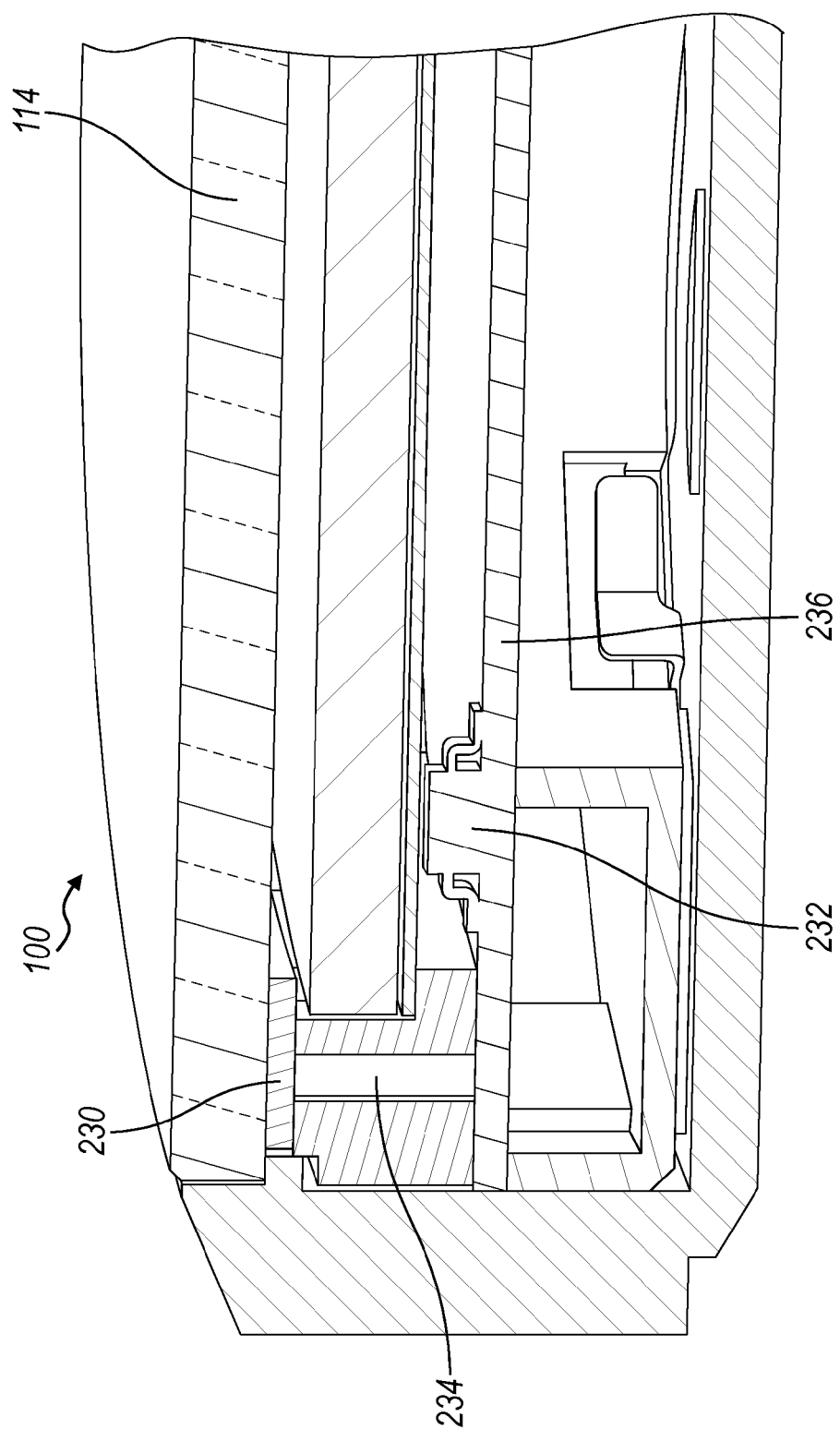
FIG. 16 is a partial sectional schematic view of the assembly of a wristwatch according to an embodiment.

FIG. 16 illustrates a cross-sectional view of the watch 100. The touch buttons 112 on the watch 100 operate through capacitive touch sensing and the concept of a variable capacitor. For capacitive touch sensing, a printed circuit board (PCB) based capacitor 230 is formed and an electric field is allowed to leak into the area above the capacitor 230, which includes the crystal 114. The sensor pad 230 and a surrounding ground pour (or ground plane underneath) create a baseline capacitance that can be measured. The base capacitance of such a sensor may be ~10 pF for a finger-sized sensor 230.

When a conductor, e.g., a finger of a user, is near to or touches the crystal 114 above the open capacitor 230, the electric field is interfered with and causes the resulting capacitance to change. The sensitivity of the sensor 230 may be adjusted through the connected detector integrated circuit 232 such that the watch crystal 114 needs to be touched to activate the sensor 230. The crystal 114 acts as an insulating layer and to provide separation between the sensor 230 and the user. The coupling of the conductive finger with the capacitive sensor 230 increases the capacitance of the structure beyond the baseline capacitance, or the capacitance of the sensor 230 with no touch. By continuously measuring the capacitance of the sensor 230 and comparing the result to a predetermined baseline capacitance, the system microcontroller 232 can determine not only on/off button functions for each sensor element but also "amount" of press used for more complex interfaces such as positional sliders.

The sensitivity of this sensor 230 is dependent on the gap between the surrounding ground and the sensor plate 230. The sensor pad 230 size of around 10-mm diameter is often used, which is similar in size to the surface area of a human finger when pressed. A ground plane underneath the sensor 230 aids in shielding it from potential interference generated by other electronics and helps to maintain a more constant baseline capacitance.

The sensor 230 is connected to a detector integrated circuit through the use of a connector 234, or other electrical connector. For example, the connector may be a conductive elastomer, or have alternating layers of a non-conductive and a conductive material, such as silicon rubber and carbon-filled silicon rubber. The connector 234 is connected to the detector integrated circuit 232 on the main circuit board 236. The main circuit board 236 is supported by the case 102 of the watch 100.

Figure 17:
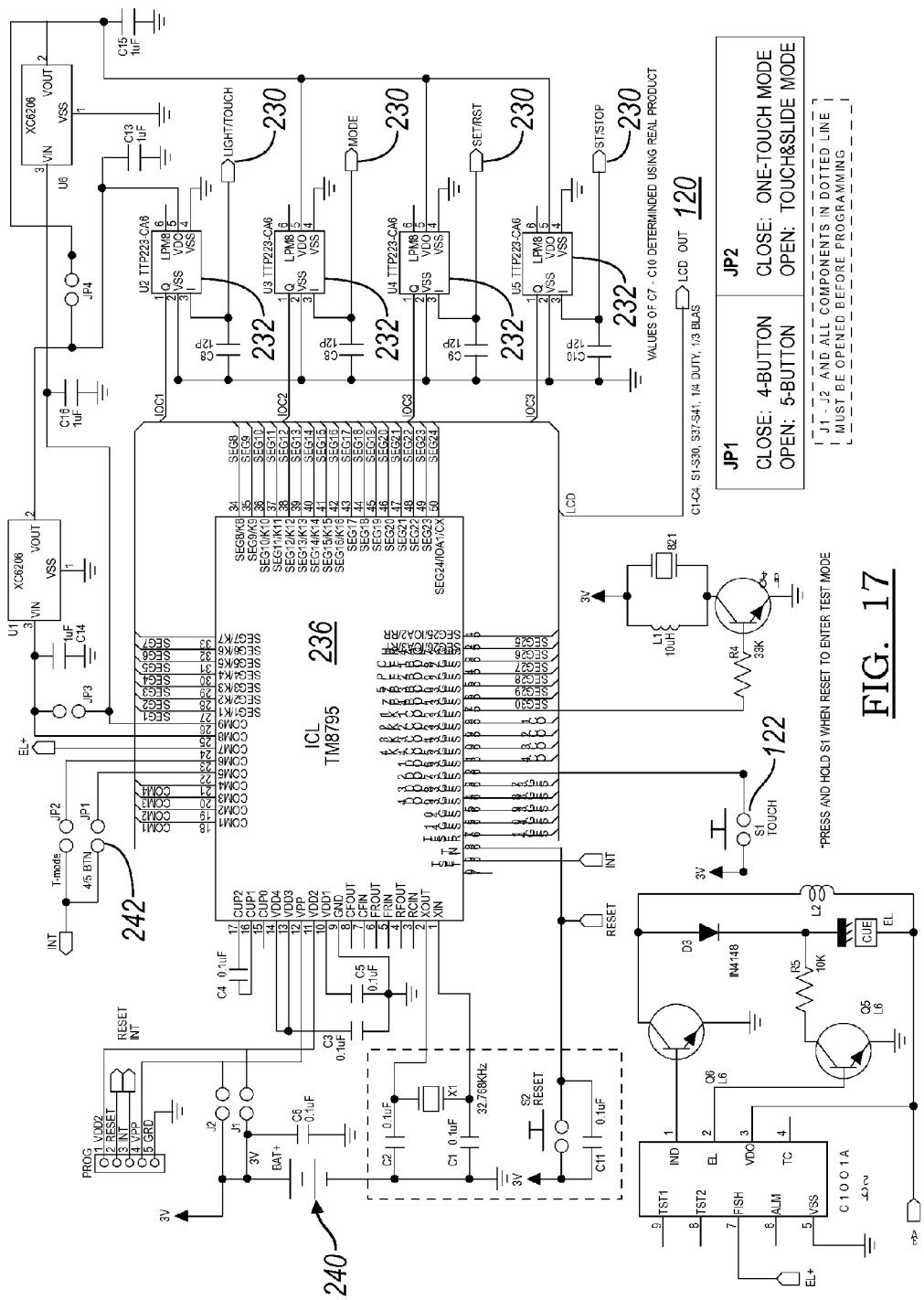
FIG. 17 is an electrical schematic for a wristwatch according to another embodiment.

FIG. 17 illustrates a schematic for the touch sensing system for the watch 100. The main circuit board 236 is connected to a power supply 240, such as a battery. Four touch sensors 230 and corresponding detector integrated circuits 232 are connected to the main circuit board 236. The main circuit board provides an output to the liquid crystal display 120 of the watch 100. The circuit board 236 has a switch 242 to allow for use with a four input watch 100 or a five input watch 100. For example, when the switch 242 is closed, the main circuit board 236 is used with a watch 100 having four inputs, or four touch buttons 112. In another example, when the switch 242 is open, the main circuit board 236 is used with a watch 100 having 5 inputs, the four touch buttons 112 and an additional tactile button 122. This allows for flexibility in manufacturing of both four and five button watches 100 using the same main circuit board 236, detector integrated circuits 232, and sensors 230. The circuit board 236 or the integrated circuits 232 may be programmed such that repeat button 112, 122 activations will not register as repeat button presses when a button is held, also known as "typematic action".

Referring back to FIGS. 1-5 and 11, in one embodiment, the watch 100 has the following modes: local time and date, world time, chronograph, timer, alarm, and backlight. The local time and date may be displayed in twelve or twenty-four hour format, with the day of the week abbreviated and displayed, the date in MM-DD format displayed, automatic leap year adjustment, a second time zone displayable, an optional hourly chime, and an optional daylight savings time (DST) function. In the world time mode, as many as thirty-two cites may be programmed into the watch 100 to represent the time zones of the various cities. Two or more cities may represent the same time zone. In the chronograph mode, which provides a stopwatch (counting upwards) function, the chronograph may have a resolution up to one one-hundredth of a second for up to twenty-four hours. In the timer mode, which provides a timer (counting downwards) function, the timer may have a one second resolution for up to twenty-four hours. In the alarm mode, the alarm may be set for daily operation with different alert chimes and the backlight may optionally flash during the alarm. For the backlight function, the display 120 is electroluminescently backlit and may have an auto-off feature after three seconds of backlighting or after release of the light input 112. Of course other numbers or combinations of modes and operational details of the modes for the watch 100 are contemplated.

Figure 18:
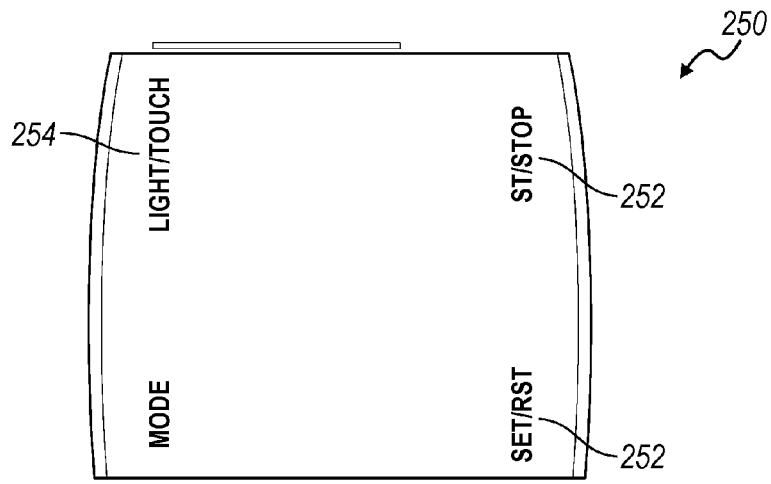
FIG. 18 is a schematic view of a four input wristwatch for the wristwatch of FIG. 6.

Referring now to FIGS. 11 and 18, a five input system 200 for a watch 100 and a four input system 250 for a watch are illustrated. For the four input system 250 or the five input system 200, the touch inputs 112 are locked automatically after a specified time period, ten seconds for example. The locking process may be audibly signalled to a user as well. The touch indicator 216 will be not present when the system is locked. The locked system prevents accidental activation of a button 112, 252.

To unlock the four input system 250 and be able to use the touch buttons 252, the user needs to activate the touch buttons 252 in a predetermined sequence. For example, by activating the [TOUCH] input 254 for approximately one second with a finger and then sliding the finger along the crystal 114 from the [TOUCH] input 254 to the [MODE] input 256 and then to the [SET] input 258 in a counter-clockwise direction. There may be a time limit on the sliding motion as an input to unlock the touch inputs 252, for example three seconds. Of course, other combinations of activated inputs are contemplated for unlocking the touch buttons 252. When the unlocking of the inputs 252 is complete, the touch indicator 216 will appear on the display and an audible signal may occur.

To unlock the five input system 200, the user activates the tactile button 122 to unlock the touch buttons 112. Of course, other combinations of activated inputs are contemplated for unlocking the touch buttons 112. When the unlocking of the touch inputs 112 is complete, the touch indicator 216 will appear on the display and an audible signal may occur.

Figure 19:
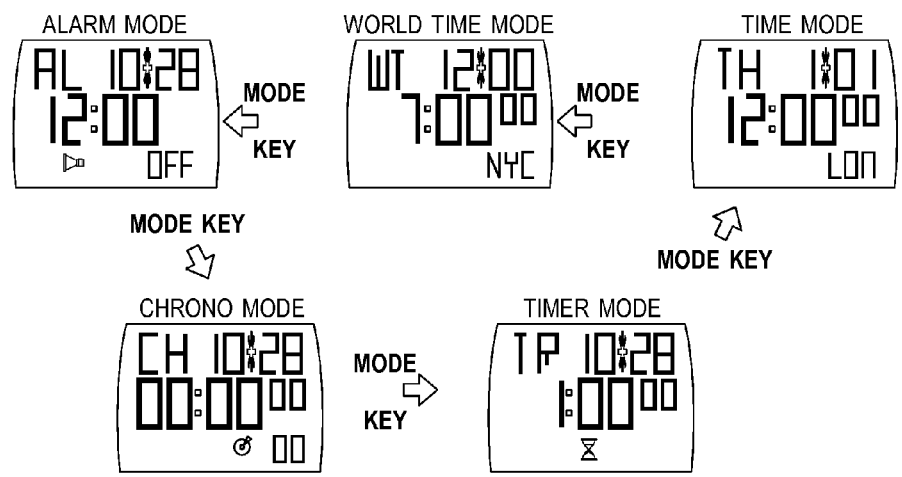
FIG. 19 is a schematic of the mode architecture for a wristwatch according to an embodiment.

FIG. 19 represents the various modes of the watch 100. The user can press [MODE] repeatedly to cycle between the modes. The modes may include time, world time, alarm, chronograph, and timer. The [MODE] input is a touch input 112 for either a four input system 250 or a five input system 200.

Figure 20:
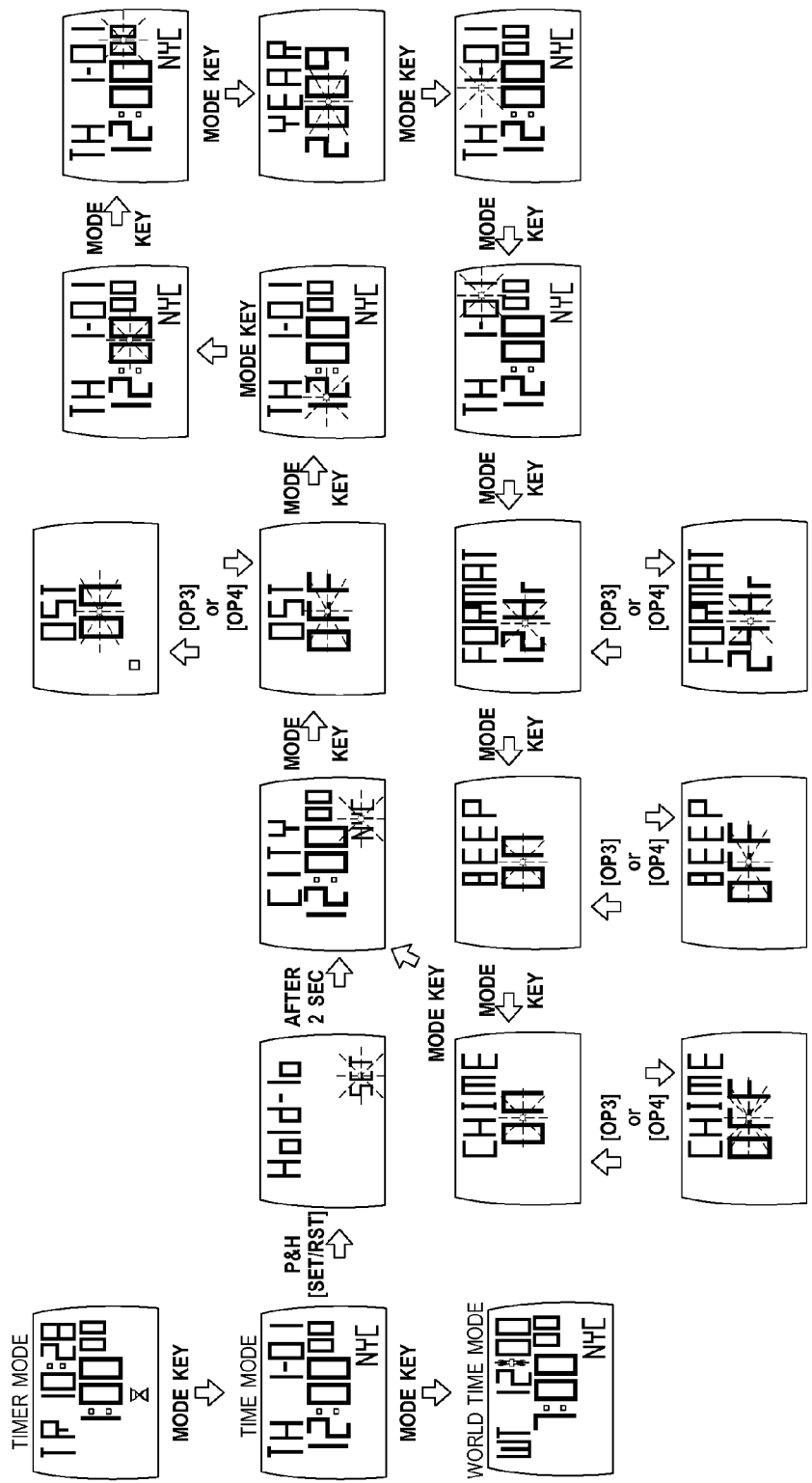
FIG. 20 is a schematic of the operation within one mode of the mode architecture of FIG. 19.
Figures 23, 25, 26:
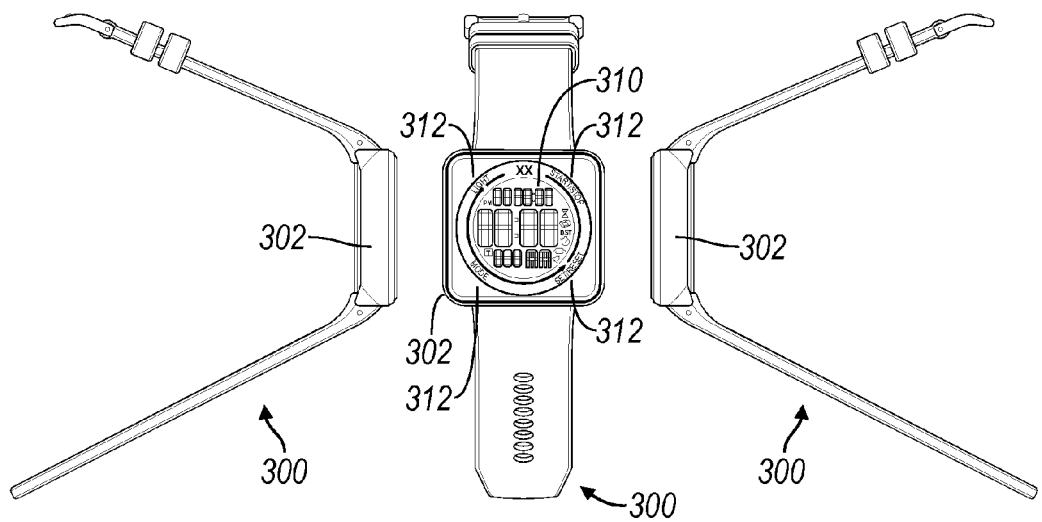
FIG. 23 is a top view of a wristwatch according to another embodiment.
FIG. 25 is a side view of the wristwatch of FIG. 23.
FIG. 26 is another side view of the wristwatch of FIG. 23.
Figures 24, 27:
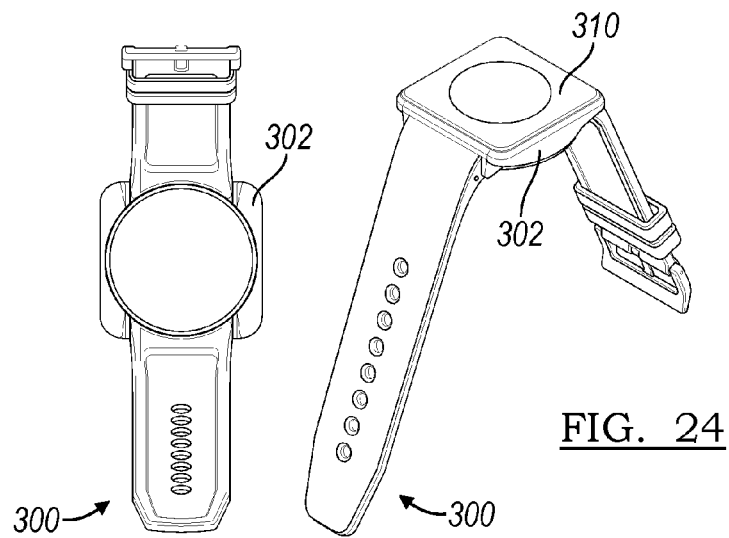
FIG. 24 is a perspective view of the wristwatch of FIG. 23.
FIG. 27 is a rear view of the wristwatch of FIG. 23.
Figures 28, 30, 31:
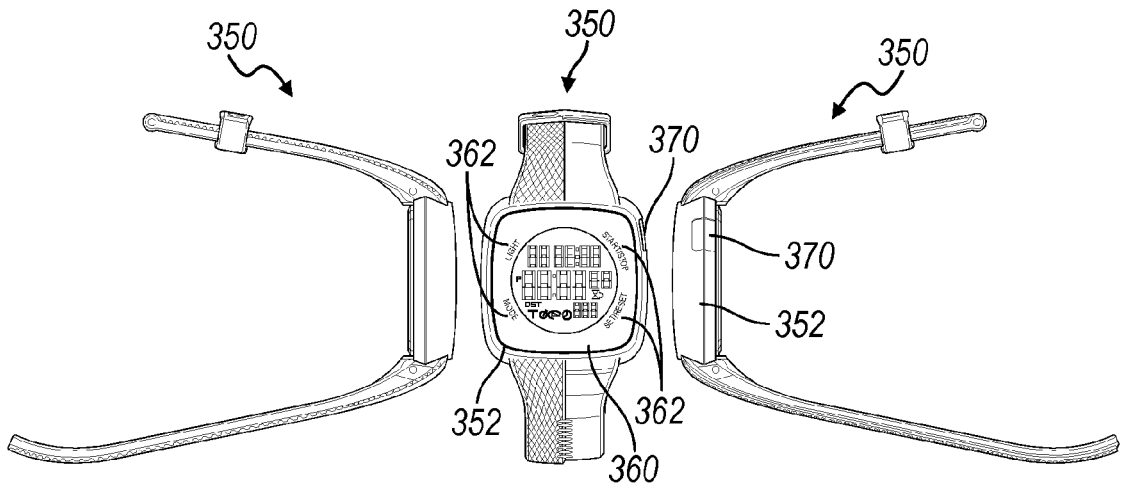
FIG. 28 is a top view of a wristwatch according to yet another embodiment.
FIG. 30 is a side view of the wristwatch of FIG. 28.
FIG. 31 is another side view of the wristwatch of FIG. 28.
Figures 29, 32:
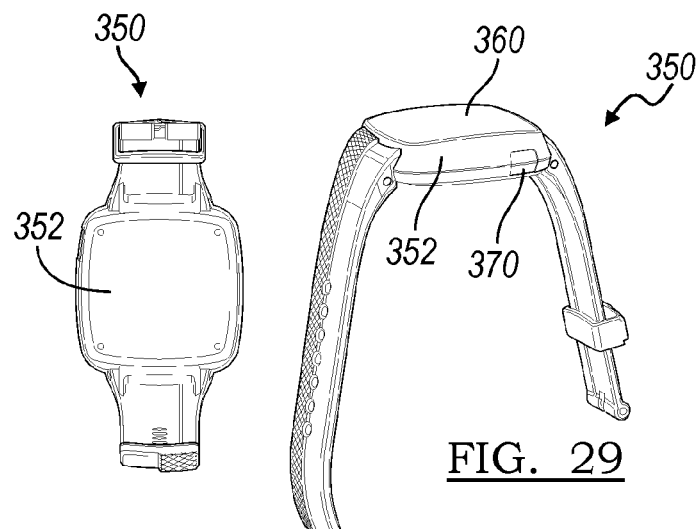
FIG. 29 is a perspective view of the wristwatch of FIG. 28.
FIG. 32 is a rear view of the wristwatch of FIG. 28.
Figures 33, 35, 36:
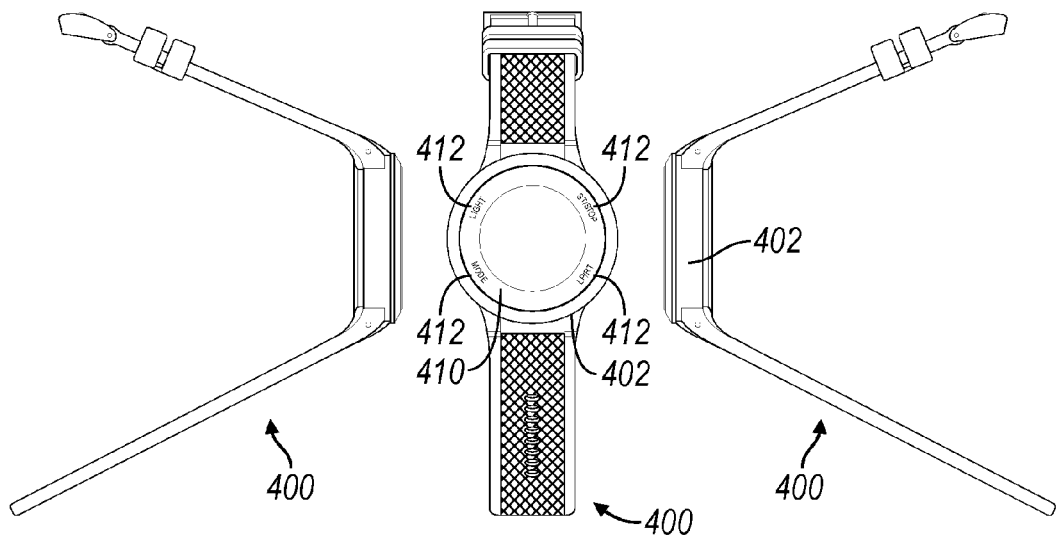
FIG. 33 is a top view of a wristwatch according to another embodiment.
FIG. 35 is a side view of the wristwatch of FIG. 33.
FIG. 36 is another side view of the wristwatch of FIG. 33.
Figures 34, 37:
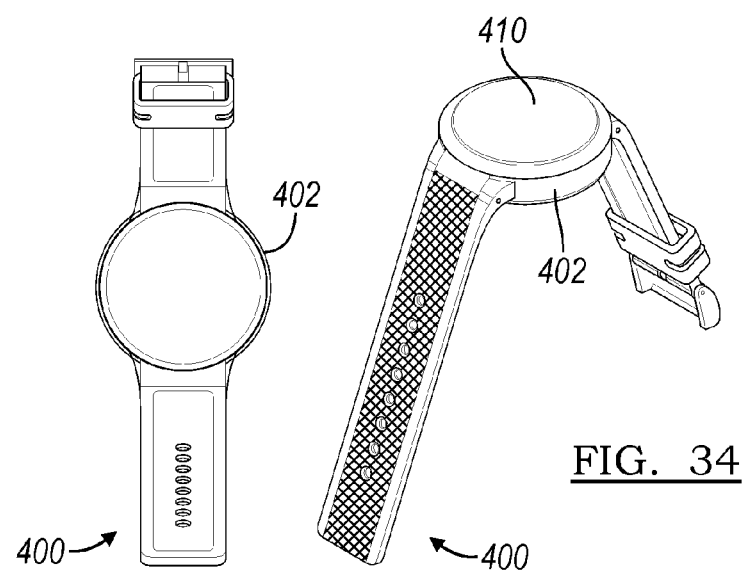
FIG. 34 is a perspective view of the wristwatch of FIG. 33.
FIG. 37 is a rear view of the wristwatch of FIG. 33.
Figures 38, 40, 41:
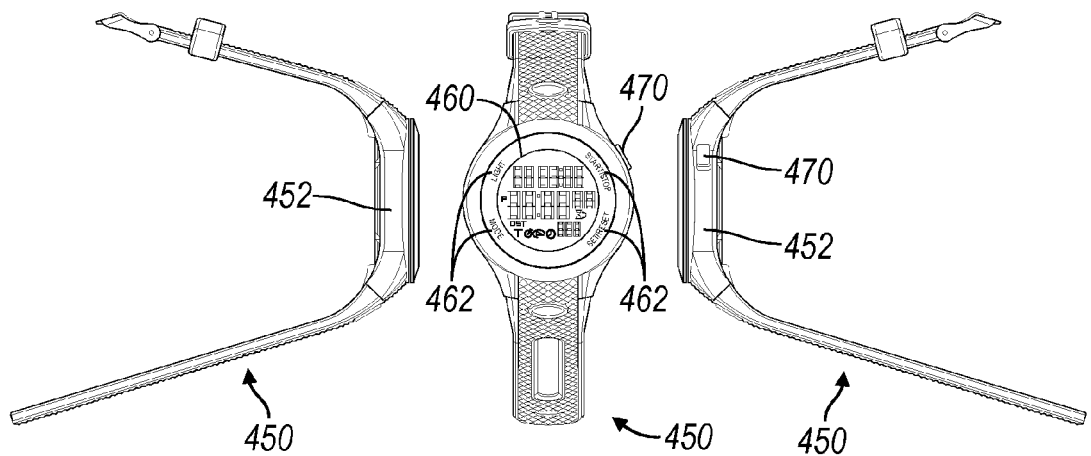
FIG. 38 is a top view of a wristwatch according to yet another embodiment.
FIG. 40 is a side view of the wristwatch of FIG. 38.
FIG. 41 is another side view of the wristwatch of FIG. 38.
Figures 39, 42:
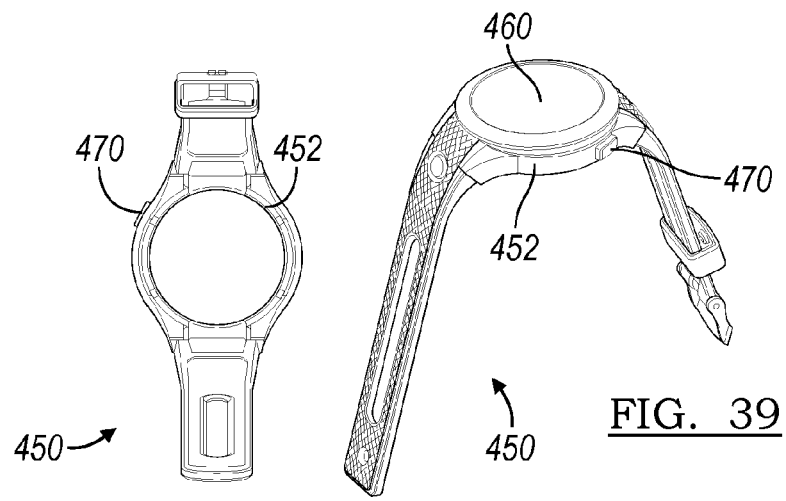
FIG. 39 is a perspective view of the wristwatch of FIG. 38.
FIG. 42 is a rear view of the wristwatch of FIG. 38.

FIG. 20 represents an embodiment of the options within a time mode. Pressing inputs 112 as denoted in the schematic will cause different screens to be displayed to a user. The asterisk over a value on a display indicates that the value appears as flashing and may be altered in some situations (as depicted) by the user. The changes values, for example of the hour or the minute, the user can input the value as a sliding function using the touch inputs 112. For example, to input an increasing setting value, the user may perform [operation 1] or [OP 1], which is sliding a finger from the [ST/STOP] input 112 to the [SET/RST] input in a clockwise motion. For example, to input a decreasing setting value, the user may perform [operation 2] or [OP 2], which is sliding a finger from the [SET/RST] input 112 to the [ST/STOP] input in a counter-clockwise motion.

FIG. 21 illustrates an embodiment of various modes and inputs available within each mode for a four input system 250. Individual activation of a touch button may provide an input to the watch. Additionally, operating two touch buttons in a sequence, i.e. by sliding on the crystal surface from [ST/STOP] to [SET/RST] in a clockwise or counter-clockwise direction may act as a user input to the watch. The touch buttons are unlocked as described previously.

FIG. 22 illustrates an embodiment of various modes and inputs available within each mode for a five input system 200. Individual activation of a touch or tactile button may provide an input to the watch. Additionally, operating two touch buttons in a sequence, i.e. by sliding on the crystal surface from [ST/STOP] to [SET/RST] in a clockwise or counter-clockwise direction may act as a user input to the watch. The touch buttons are unlocked through use of the tactile button.

In order to conserve battery power, the backlight and the audible alert caused by a piezo system may not be operating concurrently. The watch 100 may have a preference system wherein wither the backlight or the piezo system is turned off in order for the other one to operate.

FIGS. 23-27 illustrate another embodiment of a watch 300 with a touch screen. The watch has a case 302 and four touch buttons 312 located on the dial 310 of the watch 300. The watch has similar components and functions as described previously for the watch 100 described in FIGS. 1-5.

FIGS. 28-32 illustrate yet another embodiment of a watch 350 with a touch screen. The watch has a case 352 and four touch buttons 362 located on the dial 360 and a tactile button 370 on the case 352 of the watch 350. The watch has similar components and functions as described previously for the watch 100 described in FIGS. 1-5.

FIGS. 33-37 illustrate another embodiment of a watch 400 with a touch screen. The watch has a case 402 and four touch buttons 412 located on the dial 410 of the watch 400. The watch has similar components and functions as described previously for the watch 100 described in FIGS. 1-5.

FIGS. 38-42 illustrate yet another embodiment of a watch 450 with a touch screen. The watch has a case 452 and four touch buttons 462 located on the dial 460 and a tactile button 470 on the case 452 of the watch 450. The watch has similar components and functions as described previously for the watch 100 described in FIGS. 1-5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A wristwatch comprising:
   a case and a crystal;
   an integrated circuit received within the case; and
   first, second, third, and fourth capacitive touch sensors located beneath the crystal and in electrical communication with the integrated circuit to control operation of the wristwatch;
   wherein the capacitive touch sensors provide four inputs to the integrated circuit to control operation of the watch, the first input through a user activating the first sensor, the second input through the user activating the second sensor, the third input through the user sweeping along the crystal and activating the first sensor prior to the second sensor within a predetermined time limit, and the fourth input through the user sweeping along the crystal and activating the second sensor prior to the first sensor within the predetermined time limit;
   wherein the capacitive touch sensors provide a fifth input to the integrated circuit to control operation of the watch, the fifth input through the user sweeping along the crystal and activating the first sensor, the second sensor, and the third sensor in sequence within another predetermined time limit;
   wherein the fifth input unlocks a touch function for the wristwatch with the first sensor continuously activated for at least a predetermined time period before the second and third sensors are activated by sweeping; and
   wherein each capacitive touch sensor is spaced apart from an adjacent capacitive touch sensor.

2. The wristwatch of claim 1 wherein the four capacitive touch sensors are generally equally spaced apart along the periphery of the watch.

3. The wristwatch of claim 1 further comprising a tactile button positioned on the side of the case.

4. The wristwatch of claim 1 wherein the crystal is generally circular.

5. The wristwatch of claim 1 wherein the crystal is generally rectangular.

6. The wristwatch of claim 1 further comprising
   a battery connected to the integrated circuit to provide power for operation of the wristwatch;
   four detector circuits, each detector circuit connected to the integrated circuit and to a respective one of the capacitive sensors.

7. The wristwatch of claim 6 further comprising an elastomeric connector for electrically connecting the capacitive sensor to the detector circuit.

8. The wristwatch of claim 7 wherein the detector circuit determines if the sensor is being actuated by a user by comparing a reference capacitive measurement to a capacitive measurement when a capacitive field adjacent to the sensor is disturbed by the user.

9. The wristwatch of claim 8 wherein a sliding input is determined by the integrated circuit when receiving a touch input from one of the capacitive sensors and a second touch input from an adjacent one of the capacitive sensors within a predetermined time limit.

10. The wristwatch of claim 1 wherein the crystal defines a first, second, third, and fourth quadrant associated with the first, second, third, and fourth capacitive touch sensor respectively.

11. The wristwatch of claim 10 wherein the wristwatch has no more than four capacitive sensors.

12. The wristwatch of claim 11 further comprising a liquid crystal display positioned in a central region of the crystal and supported by the case.

13. The wristwatch of claim 1 wherein the capacitive touch sensors are located adjacent to the periphery of the crystal and are spaced apart from each other to minimize a user accidentally engaging an incorrect adjacent sensor.

14. A wristwatch comprising:
   a case and a corresponding crystal; and
   an integrated circuit sized to be received with the case, the integrated circuit having a switch, the switch providing for both use with either a four sensor watch or a five sensor watch;
   wherein for the four sensor watch, the watch has four capacitive touch sensors located beneath the crystal and adjacent to the periphery of the crystal, the watch without tactile button sensors on the case, the touch sensors in electrical communication with the integrated circuit;
   wherein for the five sensor watch, the watch has four capacitive touch sensors located beneath the crystal and adjacent to the periphery of the crystal, the touch sensors in electrical communication with the integrated circuit, and a tactile button sensor located adjacent to the case and in communication with the integrated circuit;
   wherein the switch is in a first position when the integrated circuit is used with the four sensor watch; and
   wherein the switch is in a second position when the integrated circuit is used with the five sensor watch.

15. A wristwatch comprising:
   a case and a crystal;
   an integrated circuit received within the case;

a piezo system; and first, second, third, and fourth capacitive touch sensors located beneath the crystal and in electrical communication with the integrated circuit to control operation of the wristwatch, each capacitive touch sensor is spaced apart from an adjacent capacitive touch sensor;

wherein the capacitive touch sensors provide five inputs to the integrated circuit to control operation of the watch, the first input through a user activating the first sensor, the second input through the user activating the second sensor, the third input through the user sweeping along the crystal and activating the first sensor prior to the second sensor within a predetermined time limit, the fourth input through the user sweeping along the crystal and activating the second sensor prior to the first sensor within the predetermined time limit, and the fifth input through the user sweeping along the crystal and activating the first sensor, the second sensor, and the third sensor in sequence within another predetermined time limit;

wherein one of the third input, fourth input, and fifth input unlock a touch function for the wristwatch; and wherein an audible signal from the piezo system and a visible touch indicator are provided by the wristwatch when the touch function is unlocked.

* * * * *